United States Patent
Mohammed et al.

(10) Patent No.: US 11,553,402 B2
(45) Date of Patent: *Jan. 10, 2023

(54) SYSTEMS AND METHODS FOR SUBSCRIPTION BASED MULTICAST SERVICE DISCOVERY

(71) Applicant: Verizon Patent and Licensing Inc., Basking Ridge, NJ (US)

(72) Inventors: Mansoor Ali Shah Mohammed, Plano, TX (US); Kevin Lisewski, Ramsey, NJ (US); John J. Arky, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,971

(22) Filed: Jul. 16, 2021

(65) Prior Publication Data

US 2021/0345228 A1 Nov. 4, 2021

Related U.S. Application Data

(63) Continuation of application No. 16/686,332, filed on Nov. 18, 2019, now Pat. No. 11,089,538.

(51) Int. Cl.
*H04W 48/10* (2009.01)
*H04W 72/00* (2009.01)
*H04W 4/08* (2009.01)
*H04L 12/18* (2006.01)

(52) U.S. Cl.
CPC ........... *H04W 48/10* (2013.01); *H04L 12/185* (2013.01); *H04L 12/1845* (2013.01); *H04L 12/1859* (2013.01); *H04W 4/08* (2013.01); *H04W 72/005* (2013.01)

(58) Field of Classification Search
CPC ..... H04W 48/10; H04W 4/08; H04W 72/005; H04L 12/1845; H04L 12/185; H04L 12/1859
See application file for complete search history.

(56) References Cited

U.S. PATENT DOCUMENTS

| 7,626,975 | B2 * | 12/2009 | Colban | H04L 12/1881 370/510 |
| 7,725,101 | B2 * | 5/2010 | Gerstenberger | H04W 12/08 455/414.3 |
| 2004/0202319 | A1 | 10/2004 | Hussain et al. | |

(Continued)

FOREIGN PATENT DOCUMENTS

WO  WO-2004075516 A2 *  9/2004  ........... H04L 12/185

*Primary Examiner* — Kevin D Mew

(57) ABSTRACT

A method may include receiving registration information from a first user equipment (UE) device and identifying a first multicast service associated with the first UE device. The method may also include transmitting, to the first UE device, a first file associated with the first multicast service and determining a number of UE devices associated with the first multicast service that have provided registration information. The method may further include determining whether a threshold associated with the number of UE devices that have provided registration information has been reached and initiating a broadcast of content associated with the first multicast service, in response to determining that the threshold has been reached.

20 Claims, 8 Drawing Sheets

(56) References Cited

U.S. PATENT DOCUMENTS

| | | | |
|---|---|---|---|
| 2004/0202329 A1* | 10/2004 | Jung | H04W 76/40 |
| | | | 380/273 |
| 2005/0026613 A1 | 2/2005 | Moon et al. | |
| 2007/0105557 A1 | 5/2007 | Israelsson et al. | |
| 2007/0220573 A1* | 9/2007 | Chiussi | H04N 21/6405 |
| | | | 725/114 |
| 2008/0069071 A1 | 3/2008 | Tang | |
| 2009/0122740 A1 | 5/2009 | Bouazizi | |
| 2011/0103286 A1 | 5/2011 | Montojo et al. | |
| 2011/0149783 A1 | 6/2011 | Zhang | |
| 2011/0280223 A1* | 11/2011 | Maeda | H04W 72/082 |
| | | | 370/335 |
| 2012/0300688 A1* | 11/2012 | Gholmieh | H04W 4/08 |
| | | | 370/312 |
| 2013/0217332 A1* | 8/2013 | Altman | G01S 1/02 |
| | | | 455/3.01 |
| 2013/0282438 A1* | 10/2013 | Hunter | G06Q 30/0201 |
| | | | 705/7.32 |
| 2013/0294321 A1* | 11/2013 | Wang | H04W 28/16 |
| | | | 370/312 |
| 2014/0192697 A1* | 7/2014 | Anchan | H04L 12/185 |
| | | | 370/312 |
| 2014/0370879 A1* | 12/2014 | Redding | H04M 3/42178 |
| | | | 455/419 |
| 2015/0078245 A1* | 3/2015 | Anchan | H04W 76/40 |
| | | | 370/312 |
| 2015/0098385 A1 | 4/2015 | Navalekar et al. | |
| 2015/0119023 A1 | 4/2015 | Wang et al. | |
| 2015/0207838 A1 | 7/2015 | Gabin et al. | |
| 2016/0057732 A1* | 2/2016 | Li | H04W 72/005 |
| | | | 370/329 |
| 2016/0316248 A1 | 10/2016 | Hao et al. | |
| 2018/0103364 A1 | 4/2018 | Gholmieh et al. | |

\* cited by examiner

SYSTEMS AND METHODS FOR SUBSCRIPTION BASED MULTICAST SERVICE DISCOVERY

RELATED APPLICATION

This patent application is a continuation of U.S. patent application Ser. No. 16/686,332 filed on Nov. 18, 2019, titled "Systems and Methods for Subscription Based Multicast Service Discovery," the disclosure of which is hereby incorporated by reference herein in its entirety.

BACKGROUND INFORMATION

Multicast communications are used to transmit data to multiple endpoints simultaneously. Currently, multicast communications are delivered to endpoints via a mechanism in which a user device subscribes to a multicast service discovery channel (SDCH). The SDCH is a dedicated channel that periodically transmits a service announcement (SA) file which includes a list of all future broadcasts. The user device monitors the SDCH and identifies multicast information pertaining to the user device.

With the increased use of multicast services, the SA file may become very large. As a result, an endpoint user device may take a significant amount of time to parse through the SA file to obtain information regarding the multicast service relevant to the particular endpoint user device. In addition, with the advent of new technologies, such as autonomous driving, the conventional multicast mechanism using a single SA file may be unable to meet certain requirements associated with multicast communications, such as low latency requirements.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein include provisioning multicast services to end user devices based on, for example, the number of user devices registering for particular multicast services, as well as the location of the user devices. For example, a content provider associated with a multicast service may identify particular groups or classes and/or subgroups/subclasses of user devices that can receive multicast transmissions. The content provider may also determine that a threshold number of user devices in particular locations are required prior to initiating multicast transmissions. In addition, the content provider may provide different multicast transmissions for particular groups/classes, and/or subgroups/subclasses of user devices based on the current location of the user devices.

A service provider, such as a wireless service provider, may receive configuration information regarding multicast services from a number of different content providers associated with different multicast services. The service provider may generate a subscribed service list file (SSLF) for each particular multicast service. The SSLF may be transmitted to user devices when the user devices register with the service provider. The SSLF may include information identifying a wireless channel to which the user devices in the multicast group should tune to obtain multicast transmissions. Such a mechanism may allow the service provider to provide SSLFs that are relevant to particular user devices and allow those user devices to easily identify a channel via which to obtain the multicast information. This allows user devices to efficiently obtain information regarding multicast transmissions and to obtain multicast information with very low latency.

Figure 1:
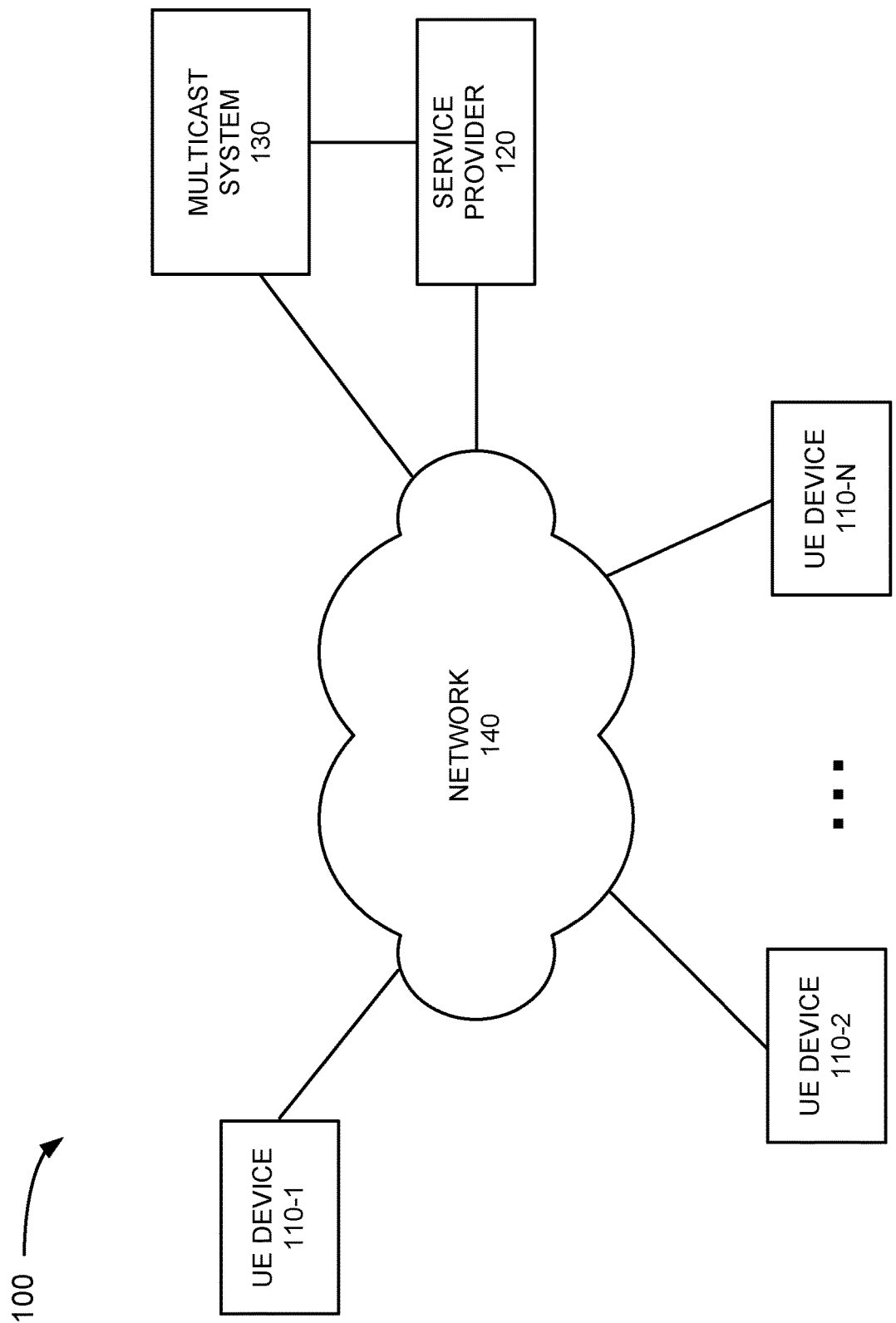
FIG. 1 illustrates an exemplary environment in which systems and methods described herein may be implemented.

FIG. 1 is a block diagram of an exemplary environment 100 in which systems and methods described herein may be implemented. Environment 100 may include user equipment (UE) devices 110-1 through 110-N, service provider 120, multicast system 130 and network 140.

UE devices 110-1 through 110-N (individually referred to as UE device 110 or 110-x and also referred to as UE 110/110-x or user device 110/110-x and collectively as UE devices 110, UEs 110 or user devices 110) may include a mobile device, such as wireless or cellular telephone device (e.g., a conventional cell phone with data processing capabilities), a smart phone, a personal digital assistant (PDA) that can include a radiotelephone, etc. In another implementation, UE devices 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a set top box, etc., that may include communication functionality. UE devices 110 may also be implemented as machine-type communications (MTC) devices, Internet of Things (IoT) devices, machine-to-machine (M2M) devices, etc., that includes communication functionality, such as a home appliance device, a home monitoring device, a camera, etc.

UE devices 110 may connect to network 140 and other devices in environment 100 (e.g., service provider 120, multicast system 130, etc.) via any conventional technique, such as wired, wireless, optical connections or a combination of these techniques. UE device 110 and the person associated with UE device 110 (e.g., the party holding or using UE device 110) may be referred to collectively as UE device 110 in the description below.

In an exemplary implementation, UE devices 110 may include a multicast enabled application that allows UE devices 110 to be authenticated and registered to receive multicast transmissions. For example, UE device 110-1 may authenticate or register with multicast system 130 and tune to particular channel to obtain multicast transmissions directed to a class or group of UE devices 110, as described in detail below.

Service provider 120 may include one or more computer devices and systems associated with providing services via network 140. For example, in one implementation, service provider 120 may be an entity that provides wired, wireless and multimedia services, such as cellular telephone and data services, home telephone service, television service, etc. Service provider 120 may communicate with UE devices 110 and/or multicast system 130 to facilitate multicast transmission for UE devices 110.

Multicast system 130 may include one or more computing devices or systems that support multicast transmission for UE devices 110. For example, multicast system 130 may generate a subscribed service list file (SSLF) for each multicast service supported by multicast system 130. Multicast system 130 may also include logic to monitor trend information, such as how many UE devices 110 in a particular location register to receive information associated with a particular multicast service. Multicast system 130 may use this trend information to determine whether a threshold or trigger point is reached. The threshold/trigger point may be used to initiate multicast transmissions to registered UE devices 110, as described in detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of wireless stations for receiving wireless signals and forwarding the wireless signals toward the intended destinations. Network 140 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 140 may provide packet-switched services and wireless Internet protocol (IP) connectivity to UE devices 110 to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and multiple services providers 120 and multicast systems 130. As an example, environment 100 may include multicast systems 130 that are geographically distributed across a large service area (e.g., nationwide). Environment 100 (e.g., network 140) may also include elements, such as evolved NodeBs (eNodeBs), next generation NodeBs (gNodeBs), base stations, switches, gateways, routers, monitoring devices, etc. (not shown), that aid in routing data and providing multicast transmissions to UE devices 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
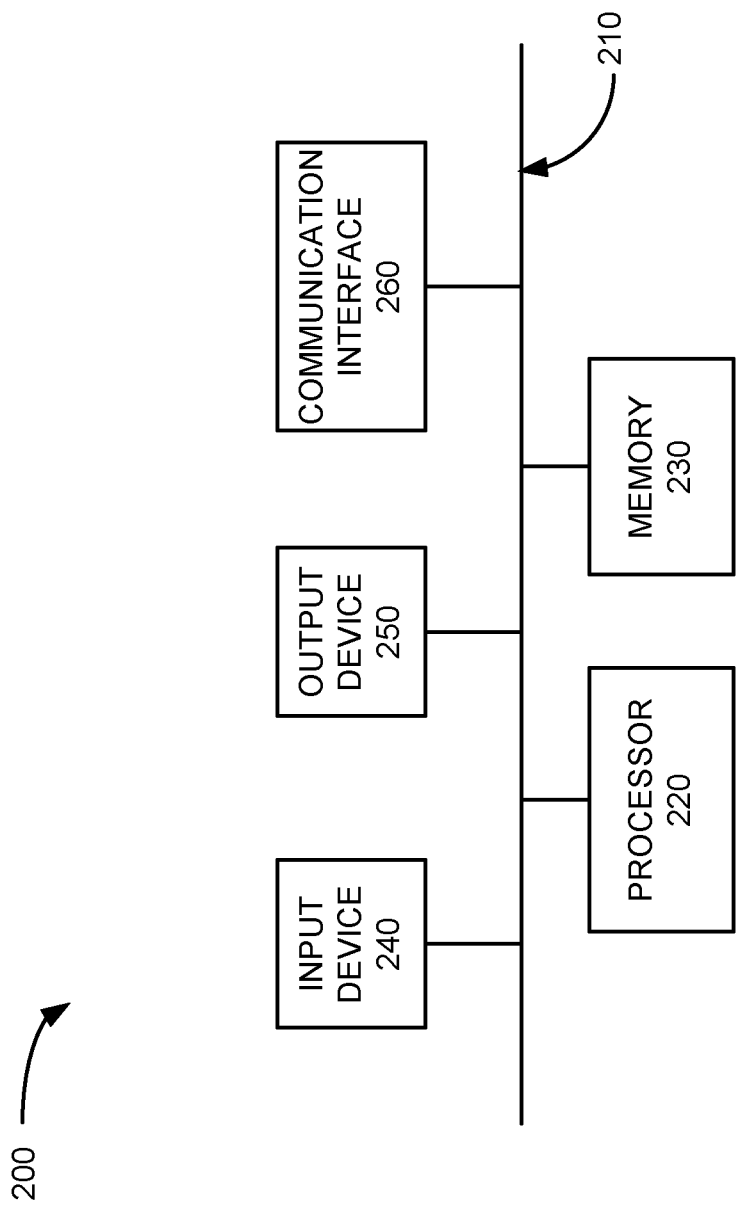
FIG. 2 illustrates an exemplary configuration of a device implemented in one or more of the components of FIG. 1.

FIG. 2 illustrates an exemplary configuration of a device 200. One or more devices 200 may correspond to or include elements implemented in UE device 110, service provider 120, multicast system 130 and/or network 140. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating with elements in a network, such as network 140 or another network.

The exemplary configuration illustrated in FIG. 2 is provided for simplicity. It should be understood that device 200 may include more or fewer components than illustrated in FIG. 2. In an exemplary implementation, device 200 (or other device in environment 100) performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
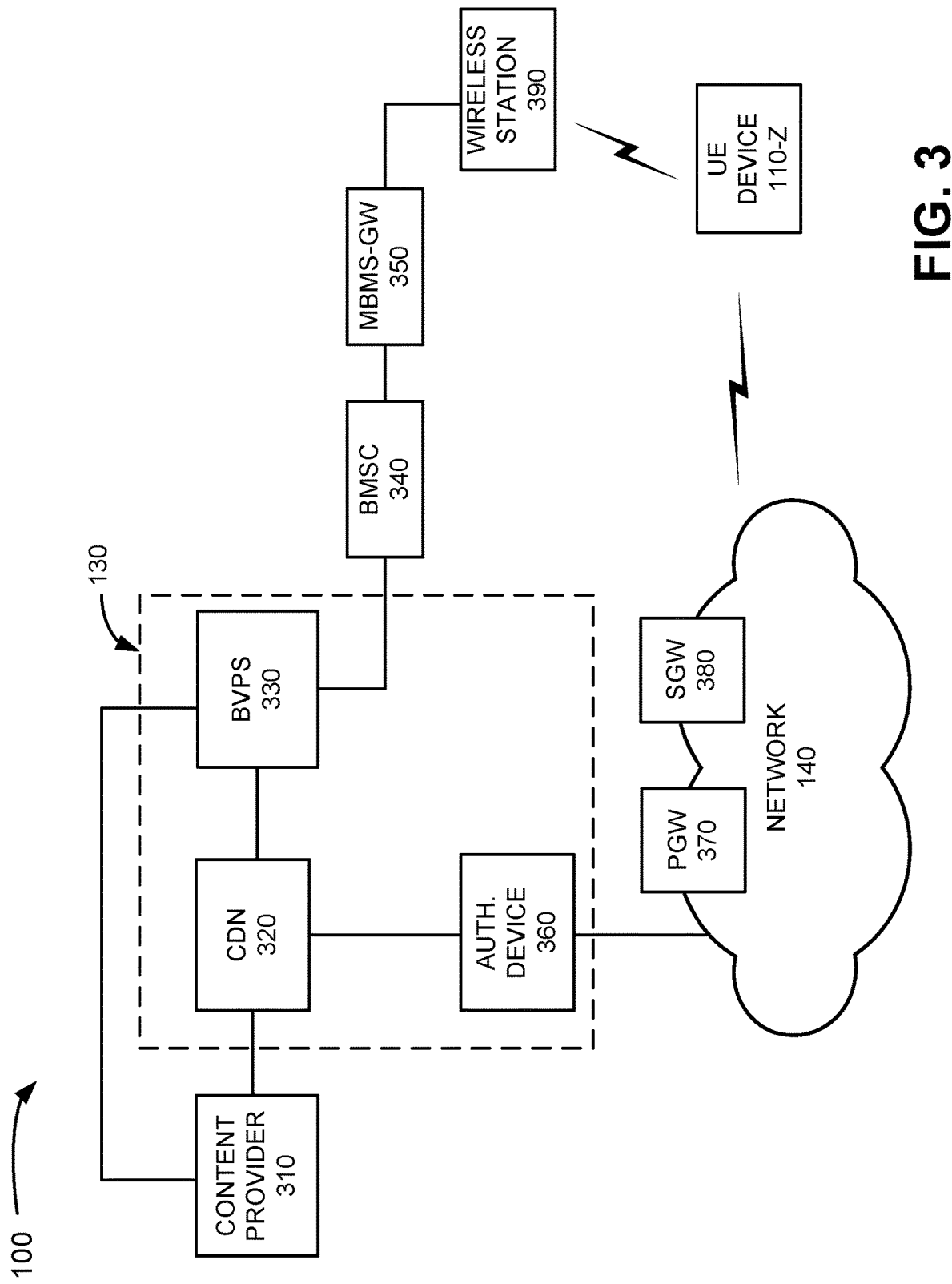
FIG. 3 illustrates components implemented in the environment of FIG. 1 in accordance with an exemplary implementation.

FIG. 3 is a block diagram illustrating exemplary components implemented in environment 100. Referring to FIG. 3, environment 100 may include content provider (CP) 310, content distribution network (CDN) 320, broadcast video provisioning system (BVPS) 330, broadcast multicast service center (BMSC) 340, multicast broadcast multicast services (MBMS) gateway (GW) 350, authorization device 360, packet gateway (PGW) 370, serving gateway (SGW) 380, wireless station 390 and UE device 110-Z. In an exemplary implementation, all or some of the components illustrated in FIG. 3 may be implemented by processor 220 executing software instructions stored in memory 230.

CP 310 may correspond to an entity providing content for broadcast to UE devices 110. For example, CP 310 may be associated with an automobile manufacturer that broadcasts information to UE devices 110, such as updates to mapping software, traffic-related information to UE devices 110 located in a particular area, informational notices regarding the vehicle, etc. As another example, CP 310 may correspond to an IoT manufacturer that transmits over-the-air firmware or software updates to the particular UE devices 110. As still another example, CP 310 may be associated with a streaming content provider that provides video-on-demand content to UE devices 110. In some implementations, CP 310 may implement service classes in which each UE device 110 is programmed with a specific service class, such as the manufacturer of a vehicle (e.g., Ford), as well as a more specific subclass, such as the model/year of the vehicle (e.g., 2018 Ford Mustang). In this manner, CP 310 may provide content to particular classes/groups and sub-classes/subgroups of UE devices 110.

Figure 4:
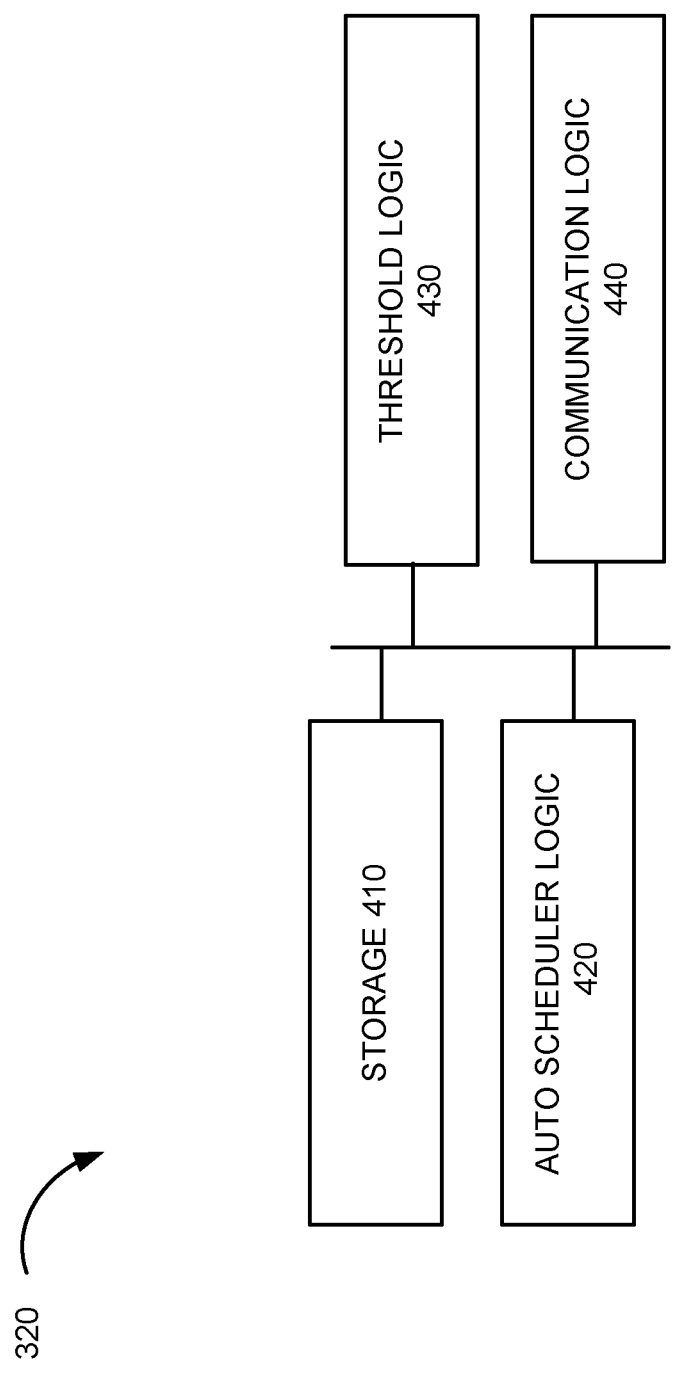
FIG. 4 illustrates an exemplary configuration of logic components included in the content delivery network of FIG. 3.

CDN 320, BVPS 330 and authorization device 360 may be part of multicast system 130. CDN 320 may include one or more computer devices that facilitate the generation of multicast transmission for particular UE devices 110 that are registered with multicast system 130 and located in particular areas. For example, FIG. 4 illustrates components implemented in CDN 320 in accordance with an exemplary implementation. Referring to FIG. 4, CDN 320 may include storage 410, auto scheduler logic 420, threshold logic 430 and communication logic 440.

Storage 410 may store boot configuration files provided to UE devices 110 during an on-boarding or registration process. For example, storage 410 may be used to store boot configuration files for UE devices 110 associated with particular multicast services. As an example, when UE devices 110 register for a particular multicast service, CDN 320 may determine whether UE device 110 is authorized for that multicast service and provide a boot configuration file to UE device 110 if UE device 110 is authorized. The boot configuration file allows a UE device 110 to obtain information for a multicast enabled application running on UE devices 110 to obtain multicast transmissions with very low latency, as described in detail below. Storage 410 may also store SSLF information regarding multicast transmissions for each multicast service supported by multicast system 130.

Auto scheduler logic 420 may include logic associated with scheduling the multicast transmissions to UEs 110. For example, auto scheduler logic 420 may determine a file download (FD) start time based on the particular multicast service. CP 310 associated with a particular multicast service may provide the schedule information stored in auto scheduler logic 420.

Threshold logic 430 may include logic to count the number of UE devices 10 registering for each multicast service. For example, UE devices 110 associated with automobiles/autonomous driving may register to receive multicast transmissions from CDN 320. Threshold logic 430 may count the number of registered UE devices 110 for a particular service and determine whether the number of UE devices in a particular location reaches a threshold number. When threshold logic 430 determines that the number of registered UE devices 110 reaches the threshold for that service in that particular location, threshold logic 430 may initiate multicast transmissions, as described in detail below. If the threshold is set to zero, multicast system 130 may immediately provide multicast broadcasts for the UE devices 110 within a particular geographical area. In some implementations, the threshold number of UE devices 110 that trigger multicast communications may be part of a service level agreement (SLA) between CP 310 and service provider 120 for each multicast service class.

Communication logic 440 may include logic associated with forwarding signals and receiving signals from other devices in environment 100, such as CP 310, BVPS 330, authorization device 360, UE devices 110, etc. For example, communication logic 440 may forward SSLF information to BVPS 330 to initiate multicast transmissions in response to information received from threshold logic 430.

Although FIG. 4 shows exemplary components of CDN 320, in other implementations, CDN 320 may include fewer components, different components, differently arranged components, or additional components than depicted in FIG. 4. In addition, functions described as being performed by one of the components in FIG. 4 may alternatively be performed by another one or more of the components of CDN 320.

Referring back to FIG. 3, BVPS 330 may include one or more computing devices to facilitate multicast transmissions to registered UE devices 110. In one implementation, BVPS 330 may generate a unique SSLF and a unique boot configuration file for each multicast service. BVPS 330 may also prepare the multicast content and file download parameters prior to the times when the multicast content is to be broadcast. That is, BVPS 330 may prepare the multicast content for broadcast prior to allow BVPS 330 to download any needed content prior to the time when such content will be broadcast.

Figure 5:
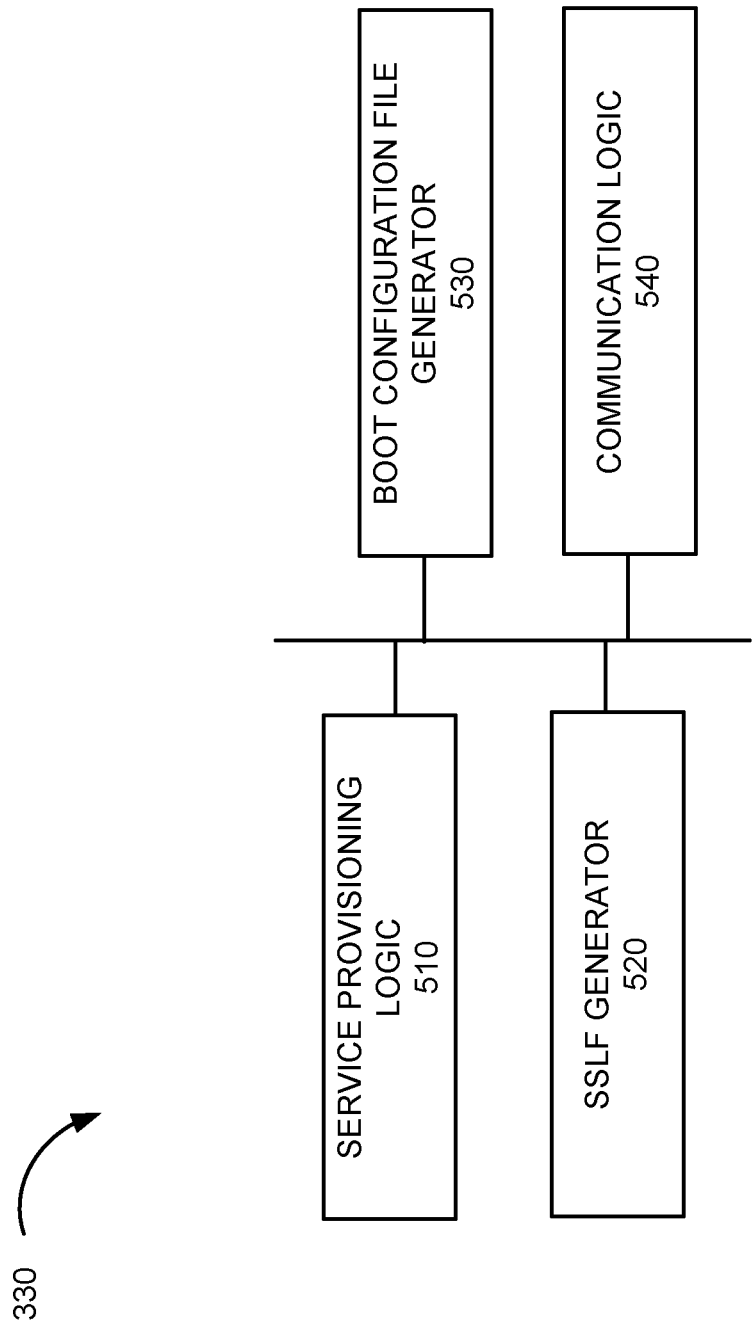
FIG. 5 illustrates an exemplary configuration of logic components included in the broadcast video provisioning system of FIG. 3.

FIG. 5 illustrates components implemented in BVPS 330 in accordance with an exemplary implementation. Referring to FIG. 5, BVPS 330 includes service provisioning logic 510, SSLF generator 520, boot configuration file generator 530 and communication logic 540.

Service provisioning logic 510 may include logic associated with provisioning multicast services in environment 100. For example, service provisioning logic 510 may receive information from CP 310 when CP 310 wishes to implement a multicast service. The information associated with the multicast service may identify UE devices 110 to which the multicast service applies, threshold information regarding the number of UE devices 110 that correspond to a threshold to begin the multicast service, location information and/or proximity information associated with multicast transmissions, etc.

SSLF generator 520 may include logic associated with generating an SSLF for each particular multicast service. For example, as discussed above, each multicast service may have a corresponding SSLF that enables UE devices 110 to tune to the multicast service. SSLF generator 520 may generate the SSLF for each multicast service supported by multicast system 130.

Boot configuration file generator 530 may generate a boot configuration file for each multicast service. For example, as described above, each multicast service may be associated with a unique SSLF, as well as a unique boot configuration file. Boot configuration file generator 530 generates a boot configuration file for each multicast service to enable multicast enabled applications on UE devices 110 to identify multicast transmissions directed to the particular UE devices 110.

Communication logic 540 may include logic associated with forwarding signals and receiving signals from other devices in environment 100, such as CP 310, CDN 320, UE devices 110, etc. For example, communication logic 540 may transmit boot configuration files to particular UE devices 110 in response to UE devices 110 registering for multicast service. Communication logic 540 may also transmit SSLFs to UE devices 110, as described in detail below.

Although FIG. 5 shows exemplary components of BVPS 330, in other implementations, BVPS 330 may include fewer components, different components, differently arranged components, or additional components than depicted in FIG. 5. In addition, functions described as being performed by one of the components in FIG. 5 may alternatively be performed by another one or more of the components of CDN 320.

Returning to FIG. 3, BMSC 340 may receive content from CDN 320 and/or BVPS 330 and cache the content for later delivery. For example, the content may be the multicast content to be transmitted to UE devices 110. MBMS-GW 350 may receive content from BMSC 340 and forward the content on toward its intended destination. For example, BMSC-GW 350 may forward content (e.g., a multicast transmission) intended for UE device 110-Z to wireless station 390 located closest to UE device 110-Z. In an exemplary implementation, BMSC 340 and MBMS-GW 350 may multicast information in accordance with 3GPP standards.

Authorization device 360 may include one or more computing devices or servers that receive registration requests from UE devices 110. For example, UE devices 110 may register for multicast services by transmitting information to authorization device 360 via network 140. Authorization device 360 may determine whether the particular UE device 110 is authorized to receive multicast transmissions and if so, signals multicast system 130 to provide a boot configuration file to UE device 110.

PGW 370 may include one or more network devices, such as a router, a gateway, a switch that processes and transfers data in environment 100. SGW 380 may include one or more network devices that forward data (e.g., data packets) in network 100. For example, SGW 380 may receive user plane information from UE device 110-Z for transmission to authorization device 360 via, for example, PGW 370. In accordance with implementations in which network 140 is a 5G network as opposed to, for example, a 4G LTE network, network 140 may include a user plane function (UPF) to route/forward packets, instead of PGW 370 and SGW 380.

Wireless station 390 may correspond to a base station, such as an eNodeB, a gNodeB, etc., that communicates wirelessly with UE devices 110 located within radio frequency (RF) range of UE devices 110, such as UE device 110-Z.

Although FIG. 3 shows exemplary components of environment 100, in other implementations, environment 100 may include fewer components, different components, differently arranged components, or additional components than depicted in FIG. 3. In addition, functions described as being performed by one of the components in FIG. 3 may alternatively be performed by another one or more of the components of environment 100.

Figure 6A:
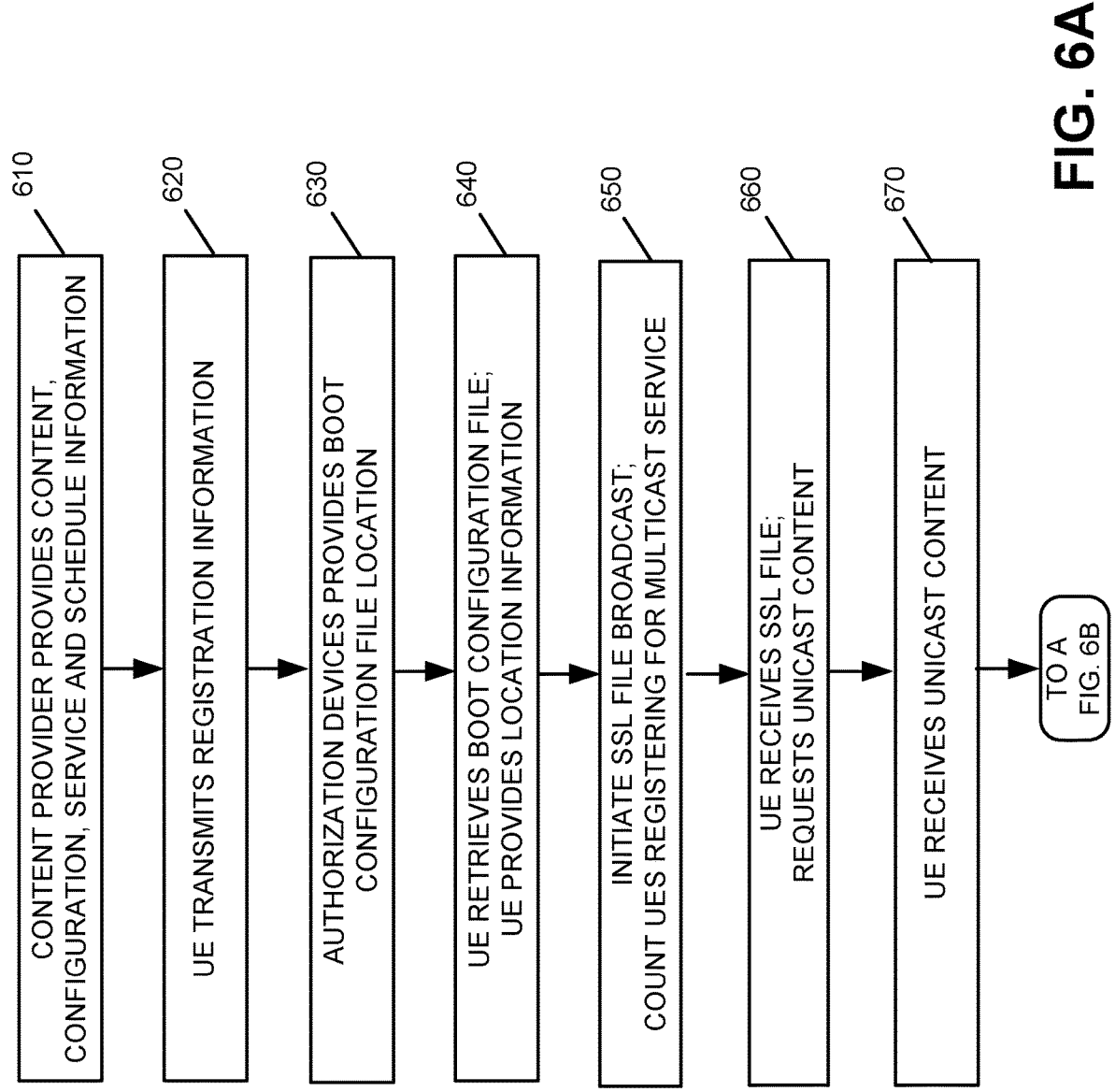
FIGS. 6A and 6B are flow diagrams illustrating exemplary processing in the environment of FIG. 3.
Figure 6B:
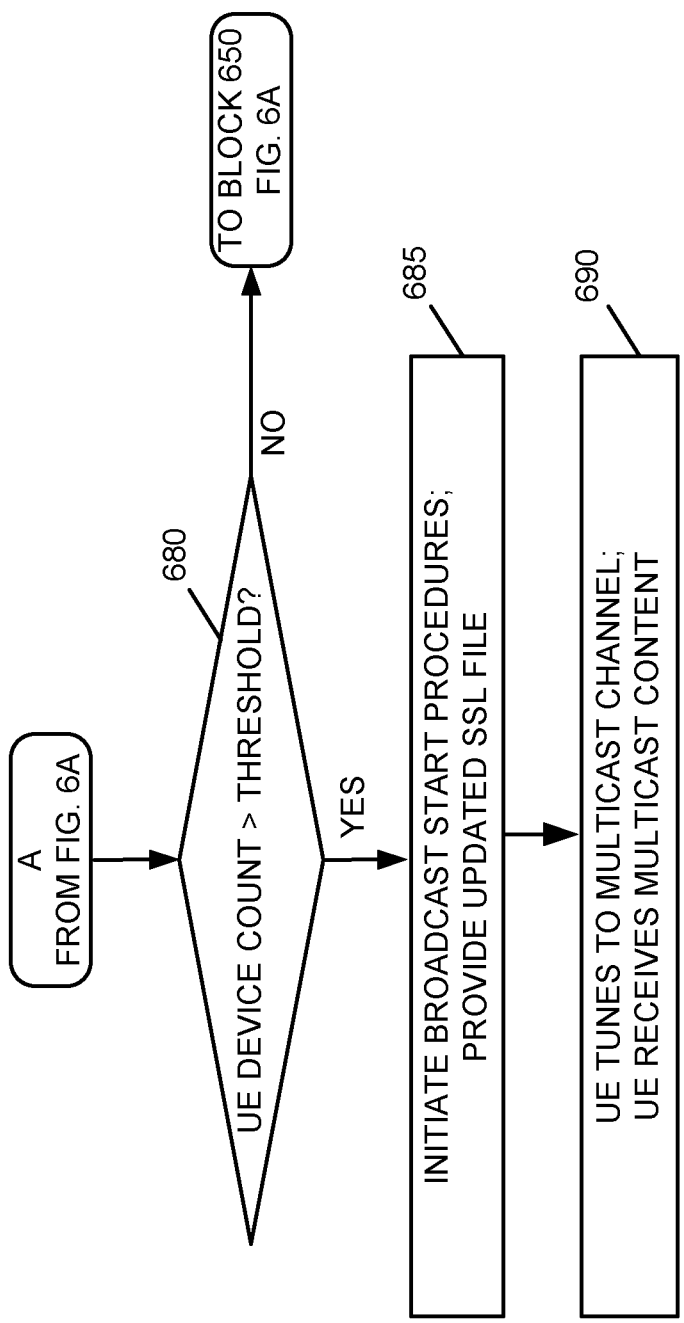
Figure 7:
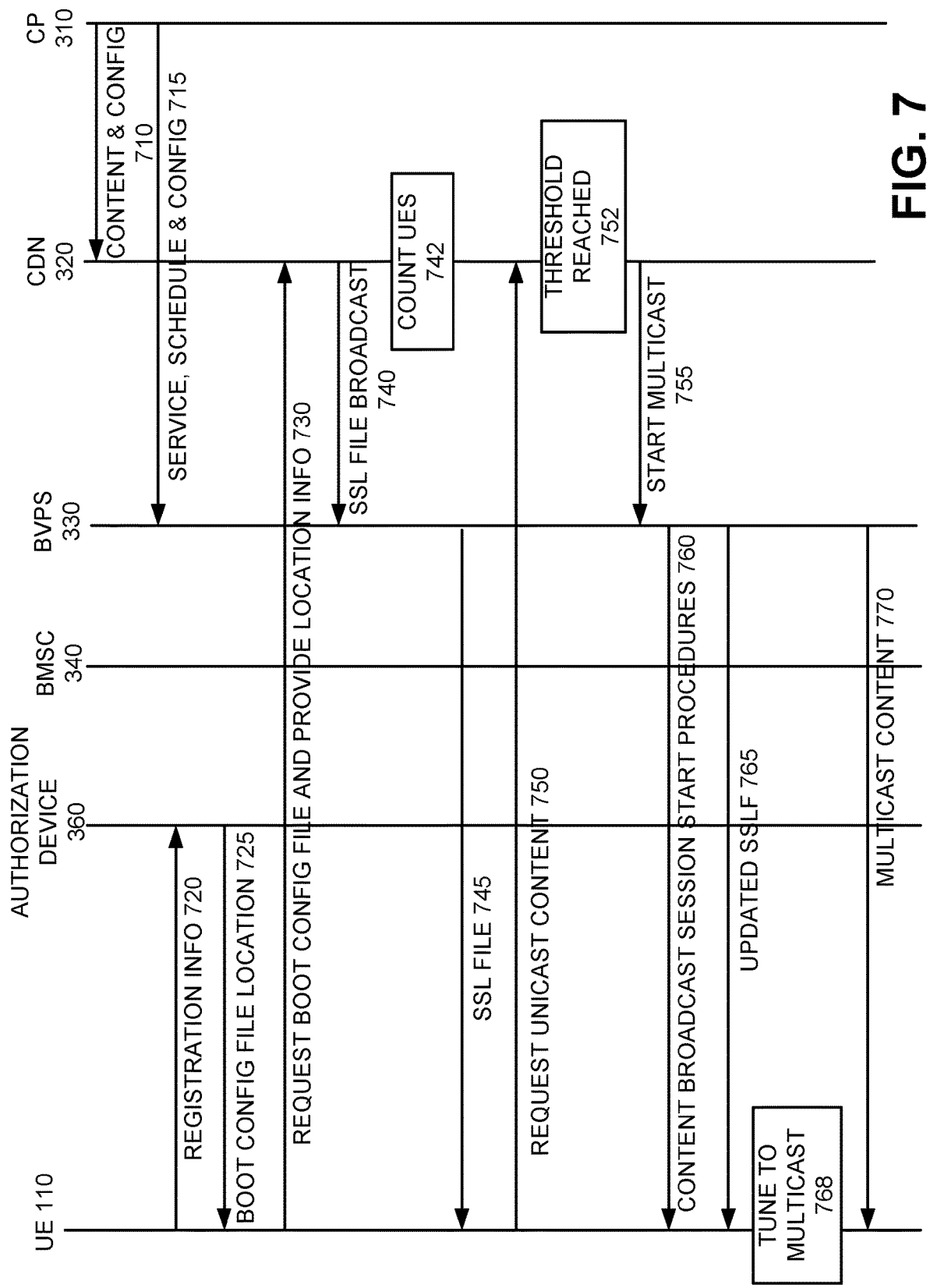
FIG. 7 is a signal flow diagram associated with the processing of FIGS. 6A and 6B.

FIGS. 6A and 6B are flow diagrams illustrating processing associated with multicast service discovery and provisioning in environment 100 and FIG. 7 is a signal flow diagram associated with the processing in FIGS. 6A and 6B.

Processing may begin with CP 310 providing content and configuration information to CDN 320 (block 610; FIG. 7, signal 710). For example, CP 310 may represent a customer that wishes to provide multicast content to particular UE devices 110, such as UE devices 110 assigned to particular service groups or classes, and/or subgroups/subclasses. CP 310 may transmit content regarding multicast transmissions to CDN 320, as well as configuration information regarding the multicast transmissions, such as the particular UE devices 110 in each multicast group or class, or subgroup/subclass supported by CP 310, the number of UE devices 110 that must be registered before multicast transmissions are to begin, as well as other configuration data associated with the multicast classes to CDN 320. In some implementations, the configuration information provided by CP 310 may also include location information associated with multicast groups. For example, CP 310 may indicate that UE devices 110 in a particular geographical area, such as a city, a zip code, a neighborhood, etc., may correspond to a class or subclass associated with a multicast service.

CP 310 may also transmit service, scheduling and configuration information regarding the multicast transmissions to BVPS 330 (block 610; signal 715). The schedule information may indicate the timing associated with particular multicast transmissions, such as whether the transmissions are periodic or at particular times as needed based on the particular multicast service. The configuration information may also identify the particular multicast service and how CP 310 wishes to implement the multicast service. For example, the configuration information may include a threshold number of UE devices 110 in a multicast class or subclass that must be registered in a particular location before multicast transmissions are to begin.

In this example, assume that UE devices 110 are running multicast enabled applications. For example, UE 110-1 may be a device included in an automobile that is configured to receive multicast transmissions from an automobile manufacturer that are directed to certain makes/models of automobiles. As another example, UE 110-2 may be an IoT device that receives over the air firmware upgrades from the manufacturer of the IoT device. In each case, UE devices 110 may run various multicast enabled applications.

In order to receive multicast transmission via multicast system 130, UE devices 110 may register and/or authenticate with service provider 120 and/or multicast system 130. For example, UE 110-Z (FIG. 3) may transmit information to authorization device 360 with user credential and/or registration-related information, such as a device identifier, user name, etc. (block 620; signal 720). Authorization device 360 receives the registration information and verifies the identity of UE 110-Z. If the identity of UE 110-Z is verified and UE 110-Z is authorized to receive multicast transmissions for a particular multicast service, authorization device 360 provides a boot configuration file location, such as a uniform resource locator (URL) identifying the location of the boot configuration file, to UE 110-Z (block 630; signal 725).

UE 110-Z receives the location of the boot configuration file and retrieves the boot configuration file from the identified location (block 640; signal 730). For example, the boot configuration file may be stored in CDN 320. UE 110-Z may also provide location information regarding the location of UE 110-Z when retrieving the boot configuration file (block 640; signal 730). For example, the location information may include geographical coordinates (e.g., global positioning system (GPS) latitude and longitude coordinates) identifying the current location of UE 110-Z. Alternatively, UE 110-Z may provide information indicating a service announcement identifier (SAID) associated with the location of UE 110-Z. In each case, CDN 320 receives the location information for the boot configuration file. As described previously, multicast system 130 may provide multicast transmissions to a particular class/subclass of UE devices 110 in a particular location. In such cases, the location information is used to determine when the threshold number of UE devices 110 in a particular location is reached.

In an exemplary implementation, once CDN 320 receives a registration request from a UE device 110, such as UE 110-Z, for a particular multicast service, CDN 320 may initiate the transmission of the subscribed service list file (SSLF) for that particular multicast service to UE 110-Z Z (block 650; signal 740). The SSLF may include information identifying a channel from which UE 110-Z will obtain multicast transmissions.

CDN 320 may also count the number of UEs 110 requesting the boot configuration file (block 650; FIG. 7 block 742). For example, as described above, threshold logic 430 may count the number of UE devices 110 associated with a particular multicast group/class requesting the boot configuration file. This information may represent a demand associated with the particular multicast class. Threshold logic 430 may also store a threshold number of UE devices 110 for each particular multicast service before CDN 320 will begin multicast transmissions for the multicast service. As also described above, in some implementations, threshold logic 430 may determine whether the number of UE devices 110 for each multicast class and/or subclass located in a particular geographic location (e.g., a city, a zip code, a neighborhood, etc.) meets a threshold or demand before initiating a multicast transmission. If the threshold is set to zero, CDN 320 will begin multicast transmission immediately when multicast content is available.

UE device 110-Z may receive the SSLF and configure the multicast enabled application executing on UE 110-Z based on the received SSLF (block 660; FIG. 7, signal 745). UE 110-Z may also signal CDN 320 to request unicast content (signal 750). UE 110-Z may then receive unicast content when such content is available (block 670). In some implementations, UE 110-Z may also periodically check the channel identified in the SSLF to determine if multicasting has begun or is going to begin relatively soon.

As described above, threshold logic 430 stores a threshold associated with each class of UE devices 110 for each multicast service and counts the number of UE devices 110 registering for each multicast service. For example, threshold logic 430 may indicate that the threshold number of UE devices 110 for a particular multicast service is ten UE devices 110 (e.g., automobiles) located in a particular geographical area (e.g., city, zip code, etc.) before multicast transmissions are to begin.

Threshold logic 430 may continue to count the number of UEs in each class associated with each multicast service and determine if the UE device 110 count is greater than the threshold (FIG. 6B, block 680). If CDN 320 determines that the UE device 110 count is not greater than the threshold for a particular multicast service in a particular location (block 680—no), threshold logic 430 may continue to monitor the number of UE devices 110 registering for that multicast service at block 650 (FIG. 6A). If, however, threshold logic 430 determines that the UE device 110 count for a particular multicast service and location is greater than the threshold (block 680—yes; FIG. 7, block 752), CDN 320 may begin a multicast broadcast session (block 685).

For example, in one implementation, CDN 320 signals BVPS 330 to initiate the multicast (block 685; signal 755). BVPS 330 may initiate a content broadcast session by transmitting content broadcast start procedures to UE 110-Z (signal 760). BVPS 330 may also update the SSLF with a subscription description protocol (SDP), a multicast schedule, multicast service information and other information to enable UE 110-Z to obtain multicast transmissions (block 685; signal 765). UE 110-Z receives the updated SSLF and tunes to or accesses the appropriate multicast channel identified in the updated SLLF (block 690; FIG. 7, block 768). UE 110-Z may then receive multicast content when multicast content is broadcast (block 690; signal 770). That is, UE 110-Z may switch from receiving unicast content from BVPS 330 to receiving multicast content from BVPS 330 when the multicast transmissions are initiated.

In this manner, UE devices 110 may receive multicast content based on certain parameters associated with the multicast service, such as the number of UE devices 110 registering for the multicast service, as well as the location of the registered UE devices 110. By determining the threshold number of UE devices 110 in a particular area, multicast system 130 and/or CP 310 may wait until demand for the multicast transmissions exists before initiating the multicast transmissions. In some implementations, multicast system 130 may included many distributed nodes or systems distributed across environment 100. For example, multicast system 130 may store boot configuration files and SSLFs in a number of different locations that are strategically located to be physically close to the UE devices 110 that will be using multicast enabled applications. This allows multicast system 130 to more efficiently provide the information needed for the UE devices 110 to receive the multicast transmissions.

As described previously, CDN 320 and/or BVPS 330 may multicast content from an entity, such as an automobile manufacturer, associated with providing autonomous driving via UE devices 110 located in vehicles. In this example, broadcasting driving-related information to vehicles requires very low latency so that the vehicles will be able to make operating adjustments very quickly. In the implementations described above, UE device 110 is able to tune to a multicast channel without having to parse through any large service announcement (SA) file and receive the multicast transmissions with very little latency/delay. In addition, providing targeted multicast transmissions to particular UE devices 110 may also save processing power associated with the UE device 110 obtaining multicast transmissions.

As another example, UE devices 110 may be associated with pedestrians in a city. In this example, CDN 320 and/or BVPS 330 may broadcast information (e.g., a file) that includes location, heading and velocity information associated with each pedestrian carrying a UE device 110. Other UE devices 110, such as UE devices 110 located in vehicles in the same area, may receive the pedestrian location/heading/velocity information and use the current location/heading/velocity information in, for example, an autonomous driving program to aid in avoiding pedestrians that may be crossing various streets.

In still another example, CDN 320 and/or BVPS 330 may broadcast real time kinematic (RTK) GPS corrections to UE devices 110. For example, GPS measurements are known to typically include some amount of error. In one implementation, reference stations located at, for example, wireless stations in a 4G LTE network or a 5G network that are programmed to know their location may compare their known locations to the GPS generated location information. CDN 320 and/or BVPS 330 may then identify correction information to the GPS information and broadcast the correction information to UE devices 110 located within a predetermined radius (e.g., 5 kilometers (km), 10 km, etc.) of the reference station. UE devices 110 may then correct their GPS location based on the correction data broadcast to UE devices 110. Such information may help improve GPS accuracy from, for example, 3 meters (m) to about 1 centimeter (cm). Such accuracy may be important for particular applications, such as autonomous driving.

Implementations described herein provide multicast transmissions to relevant UE devices in an efficient manner and with very low latency. This allows multicast enabled applications to operate in environments in which low latency is required. In addition, implementations described herein reduce the processing load on UE devices receiving multicast transmissions by reducing the size of files associated with identifying relevant multicast transmissions. For example, a content provider associated with a multicast service may identify particular groups or classes, and/or subgroups/subclasses of UE devices that can receive multicast transmissions and provide an SSLF for those particular groups/classes or subgroups/subclasses of UE devices. This may allow multicast system 130 to scale SSLFs for relatively small groups/classes or subgroups/subclasses of UE devices and further allows service provider 120 to reduce latency and increase efficiency with respect to network resources.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, while series of acts have been described with respect to FIGS. 6A and 6B and signal flows with respect to FIG. 7, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, by at least one network device associated with providing a plurality of multicast services, registration information from a first user equipment (UE) device;
identifying, by the at least one network device, a first multicast service associated with the first UE device;
providing, by the at least one network device and to the first UE device, information identifying a location of a configuration file, in response to verifying the registration information from the first UE device, wherein the configuration file includes information to enable an application on the first UE device to obtain multicast content; and
initiating, by the at least one network device, a broadcast of content associated with the first multicast service.

2. The method of claim 1, further comprising:
generating, by the at least one network device, a first file associated with the first multicast service, wherein the first file identifies a wireless channel via which the first UE device is to obtain multicast content; and
transmitting, by the at least one network device, the first file to the first UE device.

3. The method of claim 2, wherein the first file comprises a service list file, the method further comprising:
generating, by the at least one network device, a separate service list file for each of the plurality of multicast services.

4. The method of claim 1, further comprising:
broadcasting the content to the first UE device and other UE devices based on a location of the first UE device and locations of the other UE devices.

5. The method of claim 1, further comprising:
determining, by the at least one network device, a number of UE devices associated with the first multicast service that have provided registration information; and
determining, by the at least one network device, whether a threshold associated with the number of UE devices that have provided registration information has been reached, and
wherein initiating the broadcast of content comprises initiating the broadcast in response to determining that the threshold has been reached.

6. The method of claim 5, further comprising:
providing, by the at least one network device and prior to the threshold being reached, unicast content to the first UE device.

7. The method of claim 1, further comprising:
receiving, by the at least one network device, location information from the first UE device; and
identifying an area associated with the location information.

8. The method of claim 7, further comprising:
determining, by the at least one network device and prior to initiating the broadcast of content, whether a threshold number of UE devices that have provided registration information are located in the identified area.

9. The method of claim 1, wherein the configuration file comprises information to enable the application on the first UE device to identify multicast transmissions directed to the first UE device.

10. A device, comprising:
a communication interface; and
at least one processing device configured to:
 receive registration information from a first user equipment (UE) device,
 identify a first multicast service associated with the first UE device,
 provide, to the first UE device, information identifying a location of a configuration file, in response to verifying the registration information from the first UE device, wherein the configuration file includes information to enable an application on the first UE device to obtain multicast content, and
 initiate a broadcast of content associated with the first multicast service.

11. The device of claim 10, wherein the at least one processing device is further configured to:
generate, a first file associated with the first multicast service, wherein the first file identifies a wireless channel via which the first UE device is to obtain multicast content, and
transmit the first file to the first UE device.

12. The device of claim 11, wherein the first file comprises a service list file, wherein the at least one processing device is further configured to:
generate a separate service list file for each of a plurality of multicast services.

13. The device of claim 10, wherein the at least one processing device is further configured to:
broadcast the content to the first UE device and other UE devices based on a location of the first UE device and locations of the other UE devices.

14. The device of claim 10, wherein the at least one processing device is further configured to:
receive location information from the first UE device, and
identify an area associated with the location information.

15. The device of claim 14, wherein the at least one processing device is further configured to:
determine, prior to initiating the broadcast of content, whether a threshold number of UE devices that have provided registration information are located in the identified area.

16. The device of claim 10, wherein the configuration file comprises information to enable the application on the first UE device to identify multicast transmissions directed to the first UE device.

17. A non-transitory computer-readable medium having stored thereon sequences of instructions which, when executed by at least one processor included in a network device, cause the at least one processor to:
receive registration information from a first user equipment (UE) device;
identify a first multicast service associated with the first UE device;
provide, to the first UE device, information identifying a location of a configuration file, in response to verifying the registration information from the first UE device, wherein the configuration file includes information to enable an application on the first UE device to obtain multicast content; and
initiate a broadcast of content associated with the first multicast service.

18. The non-transitory computer-readable medium of claim 17, wherein the instructions further cause the at least one processor to:
generate, a first file associated with the first multicast service, wherein the first file identifies a wireless channel via which the first UE device is to obtain multicast content; and
transmit the first file to the first UE device.

19. The non-transitory computer-readable medium of claim 17, wherein the instructions further cause the at least one processor to:
determine whether a threshold number of UE devices that have provided registration information are located in an identified area, and
wherein when initiating the broadcast of content, the instructions cause the at least one processor to:
initiate the broadcast of content in response to determining that the threshold number has been reached.

20. The non-transitory computer-readable medium of claim 17, wherein the configuration file comprises information configured to enable the application on the first UE device to identify multicast transmissions directed to the first UE device.

* * * * *